Figure 3:
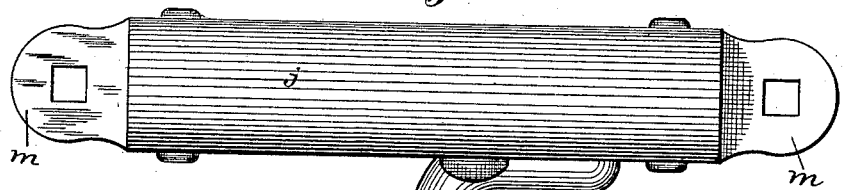

(No Model.)  2 Sheets—Sheet 1.
G. H. HUTTON.
THILL FOR VEHICLES.
No. 399,537. Patented Mar. 12, 1889.
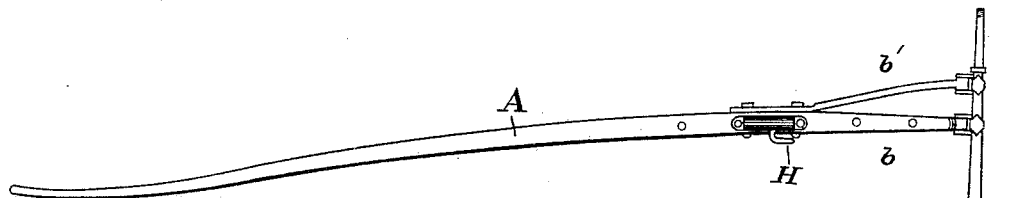
Fig. 1.
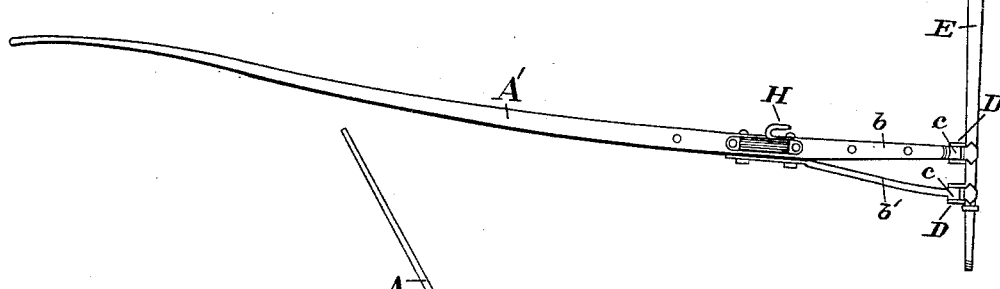
Fig. 2.
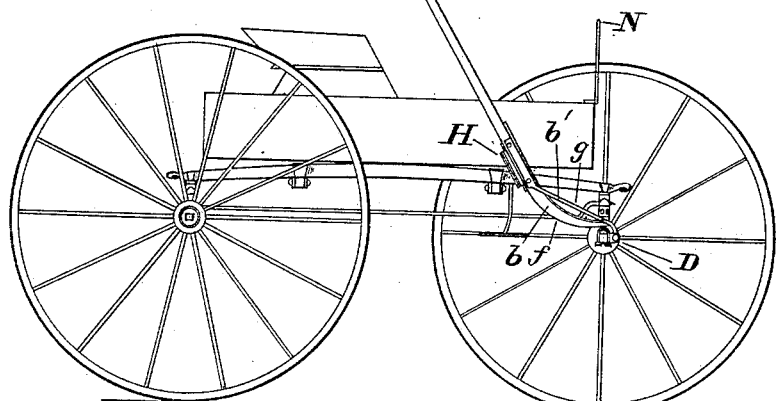
WITNESSES:
R. L. Clemmitt.
John E. Morris
INVENTOR:
George H. Hutton
BY Chas. B. Mann
ATTORNEY.
N. PETERS, Photo-Lithographer, Washington, D. C.

(No Model.) 2 Sheets—Sheet 2.

G. H. HUTTON.
THILL FOR VEHICLES.

No. 399,537. Patented Mar. 12, 1889.

WITNESSES:
R. L. Clemmitt
John E. Morris

INVENTOR:
George H. Hutton
BY Chas B. Mann
ATTORNEY.

United States Patent Office.

GEORGE H. HUTTON, OF BALTIMORE, MARYLAND.

THILL FOR VEHICLES.

SPECIFICATION forming part of Letters Patent No. 399,537, dated March 12, 1889.

Application filed November 28, 1888. Serial No. 292,104. (No model.)

*To all whom it may concern:*

Be it known that I, GEORGE H. HUTTON, a citizen of the United States, residing at Baltimore, in the State of Maryland, have invented certain new and useful Improvements in Thills for Vehicles, of which the following is a specification.

This invention relates to improvements in shafts for vehicles, and is illustrated in the drawings herewith; and it has for its objects to so construct the shafts and their connections that the said shafts may be swung upwardly back over the body of the vehicle when not in use, so that the vehicle can be compactly arranged for storage or transportation.

Figure 4:
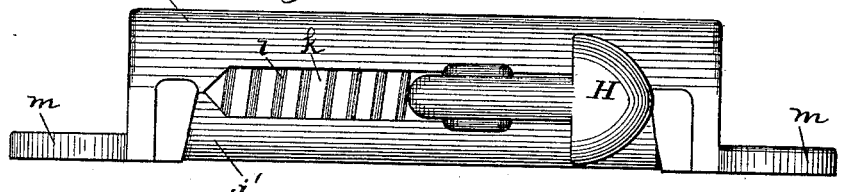
Figure 5:
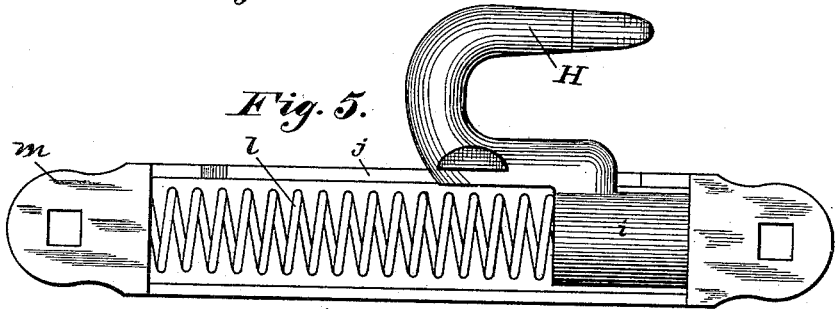
Figure 6:
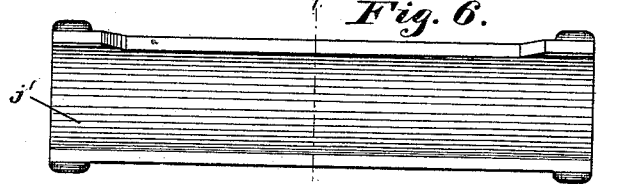
Figure 7:
Figure 8:
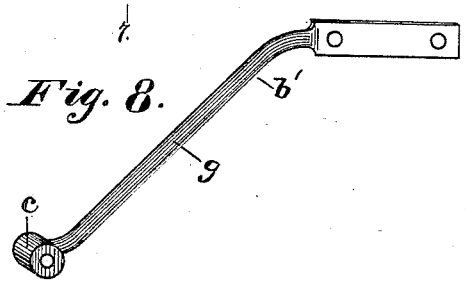

Figure 1 is a top view of the thills attached to the front axle of a vehicle. Fig. 2 is a side view of a carriage, shown with one front wheel removed in order to plainly illustrate the connection of the thill and axle. In this figure the thills are turned up and past the dash-board. Fig. 3 is a top view of the spring-yielding trace-hook device. Fig. 4 is a side view of same. Fig. 5 is a bottom view of the hook and part of the box, and shows the spring. Figs. 6 and 7 are views of the bottom part of the box. Fig. 8 is a view of the outside branch of the thill.

The letter A designates the right-hand shaft, and A' the left-hand shaft. These two shafts are entirely separate or independent from each other. No cross-bar unites them, as is commonly the case, and no singletree is employed. At the end where it is coupled to the axle each shaft has an inside branch, *b*, and an outside branch, *b'*, and each branch has an eye, *c*, by which it is bolted to the thill-coupling D, which unites it to the axle E. These branch ends *b b'* thus coupled to the axle form a joint which allows of the desired movement up and down, but prevents the shaft from turning laterally, and gives it great stability. It will be noticed that the main branch *b* of the shaft has a down curve, *f*, of usual form, while the other or outside branch, *b'*, instead of likewise curving down, extends straight, as at *g*, from its point of union with the thill to the eye *c*. The branches *b'*, being located on the outside of the shafts, brace the same, while they leave a space between the two unobstructed, so that the shafts can be turned back on each side of the vehicle-body in rear of the dash-board N.

Each shaft is provided with a spring-yielding trace-hook, H. These devices are in combination with the independent shafts, as they supply the yielding movement which a pivoted singletree affords to accommodate the action of the animal's shoulders in pulling alternately on the traces.

The trace-hook H is attached to a shank, *i*, which fits loosely and is movable in a box made of two pieces, *j j'*, and having a slot, *k*, through which the hook H projects. A spiral spring, *l*, is in the said box, and is in contact with the shank *i* of the hook. The box has flanges *m*, by which it is bolted to the shaft.

The whole device comprises only four pieces, the two parts *j j'* of the box, the hook, and the spring.

When the hook H is subjected to the strain occasioned by a pull on the trace, the spring *l* will yield more or less, according to the severity of the strain. This improvement also facilitates hooking the harnessed horse between the shafts, and enables the animal, in case one fore wheel is in a deep rut or hole, to give a direct pull on that particular side.

Obviously the construction of the spring-yielding trace-hook and its box may vary from that here shown.

In the present instance the trace-hook box is shown bolted on top of the shaft; but it will be readily understood that it may be located on the inner side of the thill.

Having described my invention, I claim—

The combination, with the shafts A A', having an unobstructed space between them, of the branches *b' b'*, secured to the outside of shafts, and a spring-yielding trace-hook attached to each of said shafts, the whole arranged to operate substantially as shown and described, and for the purposes set forth.

In testimony whereof I affix my signature in the presence of two witnesses.

GEORGE H. HUTTON.

Witnesses:
 JOHN E. MORRIS,
 JNO. T. MADDOX.